Patented Nov. 20, 1951

2,575,553

UNITED STATES PATENT OFFICE 2,575,553

PROCESS FOR PRODUCING STABLE AQUEOUS DISPERSIONS OF POLYMER CONTAINING PLASTICIZERS THEREFOR

Egbert Cornelis Hendrik Kolvoort, Amsterdam, Netherlands, assignor to Shell Development Company, San Francisco, Calif., a corporation of Delaware No Drawing. Application filed February 8, 1949, Serial No. 75,312. In the Netherlands February 11, 1948

5 Claims. (Cl. 260—29.6)

This invention relates primarily to a process for producing aqueous dispersions of polymer containing plasticizer therefor. The dispersions are characterized by their exceptional stability. If desired, the polymer dispersions besides containing one or more plasticizers, may also have present colorants as well as heat and light stabilizers for the polymer.

Aqueous dispersions of polymer containing plasticizer have been produced heretofore. It has been proposed to add a plasticizer to an aqueous dispersion of polymer, and, in order to achieve some degree of stability to the resulting mixture, it is heated to temperatures exceeding 50° C. while stirring vigorously. In this prior method, it is necessary that the heating and stirring be continued until the plasticizer has been absorbed or combined with the polymer particles since otherwise the plasticizer tends to separate.

Unlike the prior method, the process of the present invention enables production of aqueous dispersions which possess exceptional stability even though the plasticizer is present therein as particles or droplets which are separate and distinct from the polymer particles. If desired, however, the dispersions from the method of the invention may have the plasticizer partly or entirely absorbed into the suspended polymer particles. The new method is particularly advantageous because these objects of the invention are achieved without heating and with little or no agitation, the latter being important since some polymer suspensions tend to coagulate rather easily upon being agitated.

According to the process of the invention a jelly or jelly-like mixture is prepared by mixing without heating the plasticizer in liquid condition with a small quantity of a concentrated aqueous solution of an emulsifier. Upon dilution of the formed jelly with water, emulsified plasticizer is obtained having the droplets in an extremely fine state of subdivision. By effecting the dilution directly with an aqueous dispersion of polymer, there is obtained the desired dispersion of polymer containing emulsified plasticizer therein.

The use of the jelly according to the present invention offers considerable advantages. The degree of dispersion of an emulsion prepared by the jelly method is extremely high; that is to say the particles of plasticizer in the emulsion are very small. Consequently, the emulsion is exceptionally stable. While it might be possible to prepare an emulsion having the same particle size by very intensified agitation using mechanical means such as a colloid mill, the method of the invention is far simpler and cheaper. Moreover, an emulsion prepared from a jelly shows less variety in particle size than an emulsion of about the same degree of dispersion prepared by mechanical means because in the former the particles are more uniform in size. The conventional method gives an emulsion containing a considerable proportion of particles which are of larger size than the average on the whole. Consequently, the emulsion prepared by the old method, even if very vigorous mechanical agitation is employed, gives a product which is less stable than that from the method of the invention.

The jelly method gives plasticizer particles which are so small that the homogeneity of the dispersion is not disturbed even after long storage. Apparently the diffusion process by which the plasticizer is gradually transported from the plasticizer droplets to the polymer particles with reduction in size of the droplets is much faster than the demixing or creaming process. Consequently, the combined dispersion on storage is converted into a dispersion of plasticized polymer particles with corresponding disappearance of the separate plasticizer phase. The combined dispersion is still more stable than the emulsion of plasticizer in water.

Any of the substantially water-insoluble plasticizers employed with resinous polymers are suitable for use in the process, such as those organic compounds boiling above 200° C. which are compatible with the particular polymer. Preferably, the plasticizer is liquid at the normal temperature at which the jelly is prepared, this usually being at about 20° C. though it may be in the range of about 10° C. to 30° C. In those cases where it is desired to employ a plasticizer which is solid at normal temperatures, the jelly is prepared therefrom by using the plasticizer in a liquid condition obtained by incorporating it with sufficient water-insoluble liquid solvent such as benzene or toluene or another normally liquid plasticizer. The types and number of plasticizers in the plasticizer art suitable for use with this process are large and include such representative compounds as dibutyl phthalate, dioctyl phthalate, di(2-ethylhexyl) phthalate, dibutyl sebacate, dibenzyl phthalate, dioctyl adipate, triethylene glycol dioctanoate, dioctyl maleate, chlorinated diphenyl, triphenyl phosphate, tricresyl phosphate, 2-nitrodiphenyl, diethoxy ethyl phthalate, dicyclohexyl phthalate, etc. Either single plasticizer compounds may be used or combinations thereof in any number. In some cases, it is desirable to employ high-boiling aromatic petroleum extracts or chlorinated paraffins either alone or with other true plasticizers.

In forming the jelly there is used an aqueous solution of an emulsifier containing about 5% to 70% emulsifier therein, although solutions of about 30% to 60% concentration are preferred. Any of the various emulsifiers well known in the art are suitable such as, for example, soaps like sodium or potassium myristate, laurate, palmitate, oleate, stearate, rosinate or hydroabietate; or alkali metal alkyl or alkaline sulfates or sulfonates including sodium or potassium lauryl sulfates, oleyl sulfate, cetyl sulfate, stearyl sulfonate, sulfonated Turkey red oil, sulfonated mineral oils sodium alkyl naphthalene sulfonate, sodium alkyl aryl sulfonate, etc.; as well as ammonium salts of such sulfates or sulfonates such as cetyl trimethyl ammonium bromide, cetyl pyridinium bromide, sorbitol monolaurate, sorbitol monooleate, polyoxyalkylene ethers of partial esters of sorbitol with lauric, palmitic, stearic or oleic acid. Particularly suited for the invention are the salts of alkyl sulfonates wherein the alkyl groups contain about 10 to 20 carbon atoms. Such products are obtainable by known methods of subjecting paraffinic or cycloparaffinic hydrocarbon mixtures which are substantially free from aromatic hydrocarbons to reaction with sulfur dioxide and chlorine, and neutralizing the obtained sulfur chloride with a base such as sodium or potassium hydroxides. Other well suited emulsifiers are sodium alkyl sulfates obtained by sulfating olefins of 10 to 20 carbon atoms from cracked petroleum wax and forming the sodium salts thereof.

The jelly or jelly-like mixture of plasticizer is formed by adding with mixing the liquid plasticizer to about 3% to 20% of the aqueous emulsifier solution. Ordinarily, the mixing is effected with customary mechanical stirrers or agitators, although when there is tendency for the jelly to be stiff, it may be desirable to effect the mixing by a kneading or similar operation. The mixing is continued until the jelly is a substantially homogeneous mixture.

The following examples illustrate preparation of the jelly employed in the process of the invention.

Example I

Jellies were prepared by adding di-(2-ethylhexyl) phthalate to concentrated aqueous solutions of various emulsifiers. The dioctyl phthalate was admixed gradually while the mixture was slowly stirred. The emulsifiers, proportions and concentrations of the materials used in forming the jellies are tabulated below:

| Emulsifier | Per Cent Emulsifier in Aq. Solution | Per Cent Dioctyl Phthalate in Jelly |
| --- | --- | --- |
| Sodium alkyl sulfonate [1] | 5 | 85 |
| Do.[1] | 2.5 | 94 |
| Morpholine oleate | 5 | 85 |
| Sodium alkyl sulfate [2] | 4 | 91 |

[1] Product from sulfochlorination of 10 to 18 carbon atoms aromatic-free petroleum fraction, followed by saponification of resulting sulfochloride with caustic.
[2] Product from cracked petroleum wax olefins of 10 to 18 carbon atoms.

Example II

A jelly of tricresyl phosphate using as emulsifier the sodium salt of alkyl sulfates of 10 to 18 carbon atoms from cracked petroleum wax olefins. The jelly formed upon gradual addition of tricresyl phosphate to a stirred aqueous solution of the emulsifier containing 43% emulsifier. The formed jelly contained about 90% of tricresyl phosphate.

Example III

Mixture of tricresyl phosphate and dioctyl phthalate were employed to prepare jellies thereof wherein an aqueous solution containing 29% of the sodium alkyl sulfonate obtained by saponification of the product of $C_{10}$ to $C_{18}$ aromatic petroleum fractions was used. Each jelly contained 92% of the mixture of esters, in one the mixture consisting of 80% tricresyl phosphate and 20% dioctyl phthalate, and the other consisting of 67% tricresyl phosphate and 33% dioctyl phthalate.

Example IV

In order to prepare a jelly of triphenyl phosphate (melting point 52° C.), a mixture thereof with 33% added benzene, or 33% added dioctyl phthalate was prepared, each of which was liquid at room temperature. Using about a 30% aqueous solution of the emulsifier described in Example II, there were obtained jellies from each mixture which contained about 90% of the mixtures.

Example V

Jellies were prepared from the cresyl ester of toluene sulfonic acid. In the first, a jelly containing 89% of the ester was obtained with use of an aqueous solution containing 41% of the sodium alkyl sulfate described in Example I. Jellies were also obtained using an aqueous solution containing 30% of sodium alkyl sulfonate prepared by saponification of the sulfochlorides of a $C_{10}$—$C_{18}$ non-aromatic petroleum fraction. These contained 10, 20 and 33% dioctyl phthalate in admixture with the cresyl ester, the jelly in each case containing 92% of the mixture of esters.

Upon diluting the jelly of pasticizer with water, an aqueous emulsion is obtained wherein water becomes the continuous phase and the plasticizer is contained therein in an extremely finely divided and uniform state of subdivision. If desired, the jelly may be diluted with water alone to obtain an emulsion which is then admixed with the aqueous dispersion of polymer. Preferably, the dilution of the jelly is effected directly with the aqueous dispersion of polymer so that the desired product may be obtained in a single operation.

The dilution may be effected in any suitable manner. Thus, the diluent may be added to the jelly-like mixture all at once, in portions or continuously. Conversely, the jelly-like mixture may be added to the diluent along the same lines. In general, it is preferable to add the diluent to the jelly-like mixture gradually with agitation until water becomes the continuous phase. In this manner, there is continuously maintained a substantially homogeneous mixture owing to the agitation secured by the mild stirring and the graduated introduction of the diluent. If care is not taken during the early stages of the dilution, there may be formation of lumps which may require more violent agitation or kneading to break up in order to obtain dispersion of the plasticizer. After the initial formation of a continuous water phase, the remainder of the diluent may be added rapidly without undue care. In practice, it is preferable to effect the dilution by stirring vigorously or causing turbulence with the aid of a turbo-mixer or centrifugal pump. If it is desired to conduct the dilution continuously, it is advantageous to inject a stream or streams of diluent into the jelly which is preferably moving in counter-current direction.

The method of the invention is applicable to obtaining plasticizer-containing aqueous dispersions of any normally solid polymer. The polymer dispersion need be only one consisting of an emulsified suspension of dispersed solid polymer particles in an aqueous medium. Such dispersed polymer is widely available from polymerization of various monomers in aqueous emulsion in the well known manner. They are commonly referred to as a latex of the polymer. The polymer particles therein are in finely divided condition and are suspended in the aqueous medium containing an aforementioned emulsifier so that some coagulation procedure is necessary to separate the polymer from the medium. The polymer is of such character as to be solid at normal temperature of about 20° C. The emulsified suspension is obtained by homopolymerization or copolymerization of any polymerizable olefinic compound, especially those containing a vinylidine group

The polymerizable compounds which form resinous polymer by addition polymerization involving carbon-to-carbon bonding through olefinic carbon atoms include vinyl halides like vinyl chloride or bromide; vinyl esters such as vinyl acetate, propionate or butyrate; vinylidene chloride or bromide; vinyl aromatic compounds like styrene, methyl styrene and chlorostyrene; acrylate and methacrylate esters like methyl, ethyl or butyl acrylate or methacrylate; unsaturated nitriles such as acrylonitrile and methacrylonitrile; vinyl ketones such as methyl vinyl or methyl isopropenyl ketone; allyl compounds such as allyl chloride as well as similar singly olefinic compounds. Also suitable are compounds which contain a plurality of olefinic linkages between aliphatic carbon atoms that are adapted to enable formation of addition polymers as is the case with butadiene-1,3, isopropene, 2,3-dimethyl butadiene-1,3, chloroprene, divinyl benzene, 2-methyl pentadiene-2,4, 2-methyl pentadiene-1,3, ethylene glycol dimethacrylate, diallyl phthalate, diallyl dielycolate, allyl vinyl phthalate, diallyl maleate, diallyl fumarate, diallyl ether of ethylene glycol, triallyl ether of glycerol, and similar compounds as well as their homologs. Copolymers can be prepared by use of mixtures of one or more of the polymerizable compounds, the mixture containing at least an appreciable proportion of any one of the compounds, i. e. at least 1% of a second, third or fourth compound. For example, vinyl chloride can be mixed with 5% to 25% of vinyl acetate, and, if desired, 1% to 5% of divinyl benzene can be present as third constituent.

The aqueous suspension of emulsified polymer may contain any desired concentration of polymer. Ordinarily, it is preferred to employ concentrated mixtures containing about 30% to 60% polymer, although more dilute mixtures may be employed if desired.

The proportion of jelly-like mixture and aqueous dispersion of polymer is ordinarily so chosen that the resulting mixture contains about 0.1 to 1.5 parts by weight of plasticizer per part of polymer. The choice of the ratio of plasticizer to polymer is governed primarily by the properties desired in the ultimately deposited mixture of plasticized polymer. With many polymers, including polyvinyl chloride, it is preferred to employ such amounts of the jelly and polymeric dispersion that about 0.2 to 1 part of plasticizer per part of polymer is present. The particular proportions of jelly and aqueous dispersion of polymer are, of course, dependent upon the concentrations of plasticizer and polymer in their respective mixtures.

The following examples illustrate the process of the invention in detail and point out some advantages thereof.

*Example VI*

The emulsifier used was a mixture of sodium alkyl sulfonates consisting of about 65% of monosulfonates and about 35% disulfonates obtained by sulfochlorination of a mixture of saturated hydrocarbons, the constituents of which contained about 12 to about 18 carbon atoms, the average number being about 15, followed by saponification of the resulting sulfochlorides with sodium hydroxide. In 82 kg. of a 33.5% by weight solution of the emulsifier 6.9 kg. of sodium bicarbonate were dissolved. About 560 kg. of dioctyl phthalate were gradually added while stirring, thereby causing formation of a jelly-like mass. About three minutes' time passed in adding the dioctyl phthalate to the emulsifier solution. The jelly-like mixture was then mixed with 2800 kg. of a 60% by weight aqueous suspension of polyvinyl chloride and the mixture stirred until a homogeneous dispersion had been obtained.

The dispersion prepared in this manner was marked by very high stability. After months of storage, there was no trace of creaming therein. Microscopic investigation showed that the size of the emulsified plasticizer particles had gradually decreased during storage, although at first the particles in the microscopic picture were visible in all sizes, i. e., from the limit of the dispersing picture up to 4 mu, the particles from 3 to 4 mu gradually became scarcer. It should be noted that the polymer particles are smaller by one order of magnitude so that they are too minute to be seen under the microscope.

*Example VII*

The experiment of Example VI was repeated with the exception that only half the quantity was used. The dispersion obtained was very much like that of Example VI and was also marked by high stability.

*Example VIII*

An aqueous suspension of polyvinyl chloride of 60% concentration by weight was mixed with a jelly-like mixture consisting of dioctyl phthalate and a 35% aqueous solution of the emulsifier described in Example VI. The ratio by weight of polyvinyl chloride and dioctyl phthalate amounted to 3:1 while the ratio by weight of dioctyl phthalate and emulsifier (dry substance in the jelly) was 19:1. To the resulting polymer, plasticizer dispersion about 0.2% by weight of sodium bicarbonate was added.

The microscopic picture of the freshly prepared dispersion showed particles of 2 to 4 mu and the dispersion was stable. The dispersion was gradually heated in an autoclave 125° C., which temperature was attained after 1½ hours. Subsequently, microscopic investigation revealed that the particles were generally not larger than 1 mu.

Another quantity of the dispersion prepared at room temperature according to this example was heated at 160° C. for 5 minutes. When seen under the microscope, the largest particles measured 1 to 2 mu.

If desired, the jelly-like mixture of plasticizer may also contain heat and light stabilizers for the polymer and/or colorants for incorporation into the final aqueous dispersion. Thus, there may be incorporated such materials which promote chemical stability of the polymer particularly halogen-containing polymers like naphthyl glycidyl ether, resorcinol diglycidyl ether, bisphenol diglycidyl ether, diphenyl urea, sodium bicarbonate and the like. The colorants which are soluble in oil and the plasticizer include anthraquinone colors, acetamine colors and celanthrene colors. There also may be incorporated various pigments such as lead white, lithopone, titanium dioxide, lead chlorinate, lead oxide, antimony oxide and the like. The stable aqueous dispersions containing the plasticizer, and, if desired, stabilizer and/or colorants, are particularly suitable for various technical applications such as the production of voils, waterproofing of paper or fabrics by soaking these materials in the dispersions or covering them therewith, treating the fabrics to render them noncreasing, etc. If so desired, thickening agents such as casein, methyl cellulose and various other like substances may also be added to the dispersions for the above purposes.

As pointed out before, the storage of dispersions of polymers and plasticizers prepared according to the invention results in the plasticizer being gradually absorbed by the polymer. This absorption may be hastened by heating. Any temperature between room temperature and 100° C. may be applied and, if desired, temperatures exceeding 100° C. may be utilized provided the dispersion is maintained under pressure so as to prevent boiling away of the water therefrom. In general, the higher the temperature, the quicker the process of absorption. In some cases, this heating results in increase of the stability of the dispersion.

I claim as my invention:

1. A process for the production of an aqueous dispersion of solid resinous polymer containing a plasticizer for said polymer, said plasticizer being a substantially water-insoluble ester compatible with said resinous polymer and boiling above 200° C., which comprises mixing a predominant proportion of said plasticizer in liquid condition with a small quantity of an aqueous solution containing a substantial proportion of an emulsifying agent so as to thereby form a jellied mixture, and then mixing sufficient of an emulsified aqueous suspension of dispersed particles of said solid resinous polymer with said jellied mixture so that an aqueous emulsion is formed wherein water constitutes the continuous phase.

2. A process for the production of an aqueous dispersion of resinous polymer of a compound containing a vinylidene group, said dispersion containing a compatible plasticizer for said polymer which is a substantially water-insoluble ester having a boiling point above 200° C., which comprises mixing said ester in liquid condition with about 3% to 20% of an aqueous solution containing about 5% to 70% of an emulsifying agent so that a jellied mixture is formed, and then adding with mixing an emulsified aqueous suspension of dispersed particles of said solid resinous polymer containing about 30% to 60% polymer to said jellied mixture, the proportions of said suspension and said jellied mixture being such that when the two are mixed, water constitutes the continuous phase thereof and there is present therein about 0.1 to 1.5 parts by weight of said ester per part of said polymer.

3. A process for the production of an aqueous dispersion of a polymer of vinyl chloride containing a substantially water-insoluble dialkyl ester of a dicarboxylic acid which is compatible with said polymer, is a liquid at 20° C., and has a boiling point above 200° C., which comprises mixing said ester with about 10% to 15% of an aqueous solution containing about 30% to 60% of sodium alkyl sulfonate having 10 to 20 carbon atoms in the alkyl group thereof whereby a jellied mixture is formed, and then adding gradually at least until water becomes the continuous phase of the mixture while agitating an emulsified aqueous suspension of dispersed particles of said polymer, which is solid and substantially insoluble in water, to said jellied mixture, the proportion of said suspension and said jellied mixture being such that in the final mixture thereof there is present about 0.2 to 1 part by weight of said ester per part of said polymer.

4. A process for the production of an aqueous dispersion of polyvinyl chloride containing dioctyl phthalate which comprises mixing to homogeneity said ester with about 10% to 15% of an aqueous solution containing about 30% to 60% of sodium alkyl sulfonate having 10 to 20 carbon atoms in the alkyl group thereof and thereby forming a jellied mixture, and then adding an emulsified aqueous suspension of dispersed particles of polyvinyl chloride containing about 30% to 60% of said polymer to said jellied mixture, the addition being effected gradually with agitation at least until water becomes the continuous phase, and the proportion of said suspension and said jellied mixture being such that there is present in the final mixture about 0.2 to 1 part by weight of said ester per part of said polymer.

5. A process for the production of an aqueous dispersion of polyvinyl chloride containing dioctyl phthalate which comprises mixing to homogeneity said ester with about 10% to 15% of an aqueous solution containing about 30% to 60% of sodium alkyl sulfate having 10 to 20 carbon atoms in the alkyl group thereof and thereby forming a jellied mixture, and then adding an emulsified aqueous suspension of dispersed particles of polyvinyl chloride containing about 30% to 60% of said polymer to said jellied mixture, the addition being effected gradually with agitation at least until water becomes the continuous phase, and the proportion of said suspension and said jellied mixture being such that there is present in the final mixture about 0.2 to 1 part by weight of said ester per part of said polymer.

EGBERT CORNELIS HENDRIK KOLVOORT.

REFERENCES CITED

The following references are of record in the file of this patent:

UNITED STATES PATENTS

| Number | Name | Date |
|---|---|---|
| 2,041,264 | O'Kane | May 19, 1936 |
| 2,336,484 | Klinkenstein | Dec. 14, 1943 |
| 2,431,745 | Flanagan | Dec. 2, 1947 |

FOREIGN PATENTS

| Number | Country | Date |
|---|---|---|
| 518,704 | Great Britain | Mar. 5, 1940 |